United States Patent [19]
Rauh et al.

[11] Patent Number: 5,082,131
[45] Date of Patent: Jan. 21, 1992

[54] DISK-SHAPED HOUSING APPARATUS FOR RECEIVING DATA STORAGE DEVICES

[75] Inventors: Michael M. Rauh, City Island; Eugene H. Worrell, Staten Island, both of N.Y.

[73] Assignee: Nynex Corporation, New York, N.Y.

[21] Appl. No.: 573,997

[22] Filed: Aug. 28, 1990

[51] Int. Cl.[5] ............................................. B65D 6/02
[52] U.S. Cl. .................... 220/4.21; 206/328; 206/488; 206/490; 220/504; 220/526
[58] Field of Search ............... 206/328, 389, 398–402, 206/53–55, 486, 488–490, 816, 822; 220/319, 523–526, 503, 504, 4.24, 4.21

[56] References Cited

U.S. PATENT DOCUMENTS

| 1,292,935 | 1/1919 | Walsh | 220/504 |
| 1,493,381 | 5/1924 | Phelps | 206/400 |
| 2,214,993 | 9/1940 | De Witt | 220/525 |
| 2,549,681 | 4/1951 | Goldstaub | 220/4.21 X |
| 3,298,530 | 1/1967 | Clouthier | 206/391 X |
| 4,378,885 | 4/1983 | Leopoldi | 220/4.21 X |
| 4,388,991 | 6/1983 | Price . | |
| 4,762,223 | 8/1988 | Posso | 206/53 |

FOREIGN PATENT DOCUMENTS

| 1241571 | 6/1967 | Fed. Rep. of Germany | 206/0.83 |
| 1148809 | 4/1985 | U.S.S.R. | 206/438 |

Primary Examiner—Bryon P. Gehman
Attorney, Agent, or Firm—Douglas J. Kirk; John J. Torrente

[57] ABSTRACT

A housing apparatus for storing a data storage device comprising a disk-shaped body having a cavity for receiving the storage device and configured to be stored in a storage facility adapted to store and receive magnetic tape-type reels.

11 Claims, 1 Drawing Sheet

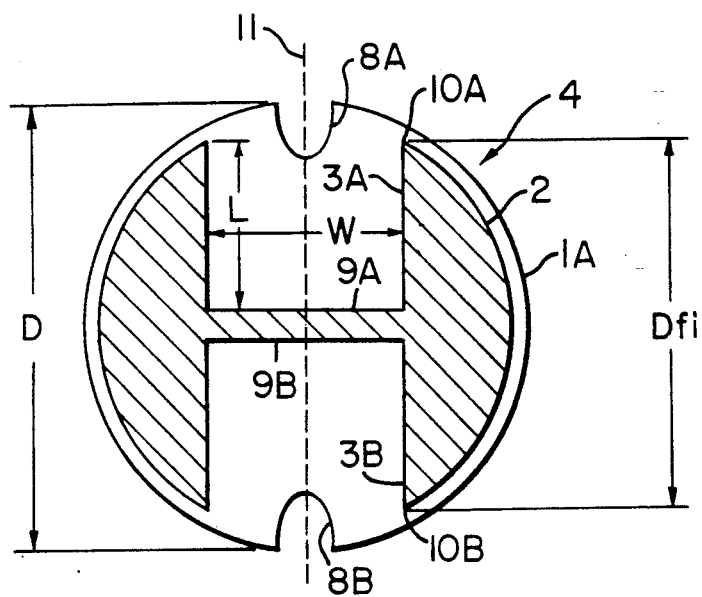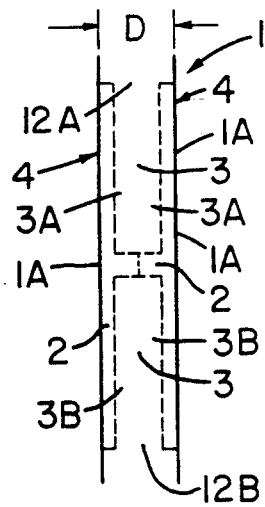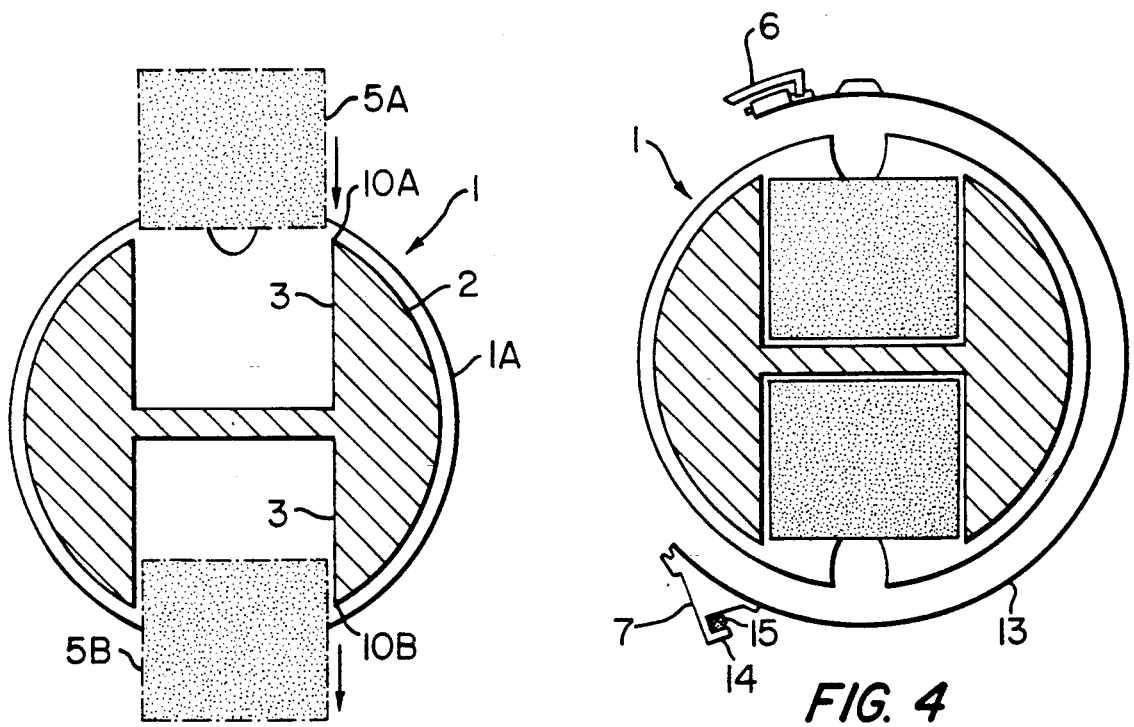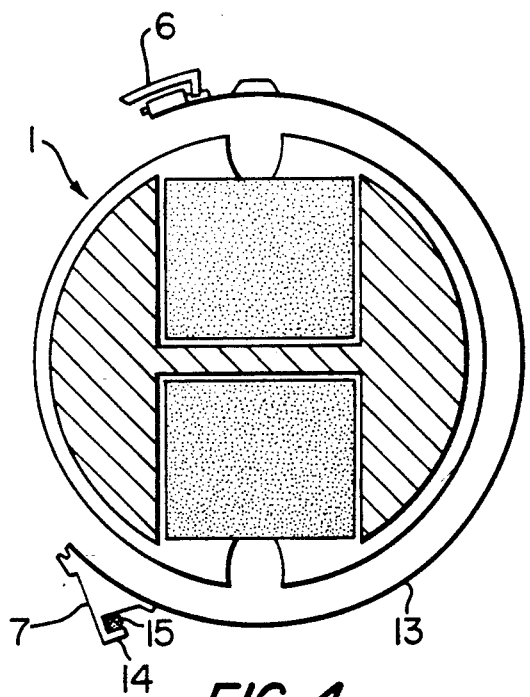

DISK-SHAPED HOUSING APPARATUS FOR RECEIVING DATA STORAGE DEVICES

BACKGROUND OF THE INVENTION

This invention relates to an apparatus for storage of data storage devices and, in particular, to a storage apparatus able to be stored in existing facilities used for magnetic tape-type reels.

Data to be used on large mainframe computers has traditionally been stored on magnetic tape type reels. In U.S. Pat. No. 4,388,991 issued June 21, 1983, for "Sealing And Storage Ring With Latch Apparatus", there is described a ring for placement around the periphery of a reel of magnetic tape thereby preventing intrusion of dust and providing a hook for storage. Large computer centers have storage facilities and procedures to store and retrieve large numbers of magnetic tape reels having such a ring in place.

As technology has progressed, the data storage devices for large mainframe computers have generally increased in capacity, while decreasing in size and changing in form relative to magnetic tape reels. Since many existing computer centers are organized to efficiently store and retrieve only the magnetic tape-type reels via the storage ring, these new data storage devices are not able to be stored in an efficient manner. Furthermore, the cost of updating the older data storage and handling systems to accomodate the new as well as older storage devices is high. Additionally, new data storage devices are evolving at such a fast rate that an updated storage and handling system could quickly again need updating.

It is therefore an object of the present invention to provide a housing apparatus for use in storing a data storage device which is adapted to be stored and retrieved in existing computer facilities arranged to handle magnetic tape-type reels.

SUMMARY OF THE INVENTION

In accordance with the principles of the present invention, the above and other objectives are realized in a housing apparatus provided with a cavity for receiving a data storage device. The housing apparatus is further configured to be stored in a storage facility adapted to store and retrieve magnetic tape-type reels.

In the embodiment of the invention to be disclosed hereinafter, the housing apparatus comprises a disk-shaped body which is provided with the data storage cavity. The latter cavity is configured to accept the data storage device through an opening in the body which can be restricted to secure the data storage device in the cavity. The body is further adapted to receive a hook at its periphery to enable the body to engage a rod within a magnetic tape-type reel storage facility. The diameter and the thickness of the disk-shaped body are further made substantially the same as that of magnetic tape-type reels normally stored in such facility.

In the disclosed embodiment, the disk-shaped body is formed from corresponding front and back disk members each comprised of an exterior plate and an interior foamed member having a cutout for defining the data storage device cavity. The disk members are joined together by a storage and sealing ring which closes off the storage cavity and has a hook for storing the storage device.

BRIEF DESCRIPTION OF THE DRAWINGS

The above and other features and aspects of the present invention will become more apparent upon reading the following detailed description in conjunction with the accompanying drawings in which:

FIG. 1 shows a disk member used in forming a housing apparatus in accordance with the principles of the present invention;

FIG. 2 illustrates a side view of a housing apparatus formed from two disk members of the type shown in FIG. 1;

FIG. 3 illustrates the housing apparatus of FIG. 2 receiving a data storage device;

FIG. 4 shows a storage and sealing ring holding the housing apparatus of FIG. 2.

DETAILED DESCRIPTION

FIG. 1, shows a disk member 4 which can be used to form a housing apparatus in accordance with the principles of the present invention. The disk member 4 comprises a circular back plate 1A having notches 8A and 8B which are located at opposite positions on the periphery of the plate. A circular insert 2 is attached to the inside of the plate 1A. The insert 2 has two cutouts 3A and 3B. The cutouts 3A and 3B are shown as opposing and rectangular. They extend from peripheral positions 10A and 10B of the insert 2 and terminate at inner edges 9A and 9B, respectively. As shown, the center line 11 of the cutouts 3A and 3B is aligned with the positions of the notches 8A and 8B.

FIG. 2 shows a side view of a housing apparatus 1 formed by bringing two disk members 4 together with their respective insert members 2 in abutting relationship and their respective cutouts 3A and 3B aligned. As can be seen, the resultant housing apparatus 1 is closed by the two exterior plates 1A. The resultant housing 1 also has two interior cavities 3 defined by the latter plates and the inserts 2 at the positions of the adjoining cutouts 3A and the adjoining cutouts 3B of the inserts. The cavities 3 are thus completely closed except for the peripheral openings 12A and 12B leading into the cavities.

In accordance with the invention, the housing apparatus is specifically adapted to receive and store rectangular data storage devices 5 in the cavities 3. This is accomplished by dimensioning the width W and length L of the cutouts 3A and 3B so that they accomodate the width and length of the devices 5 and by dimensioning the depth of the inserts so that the depth of the abutting cutouts (i.e., the depth D of the cavities 3) accomodates the depth of the devices 5.

FIG. 3 illustrates the data storage devices 5 being received by and removed from the cavities 3 through the openings 12A and 12B. When the storage devices 5 are housed in the cavities 3, marginal portions of the storage devices are exposed by the notches 8A, 8B. This facilitates easy removal of the data storage devices without necessitating special tools.

In FIG. 4, a ring 13, such as that disclosed in '991 patent, is shown as one mechanism for joining the disc members 1A together to form the integral housing apparatus 1 of FIG. 2. The ring 13 is placed around the periphery of the outer plates 1A, thereby holding the plates and inserts 2 together to form the housing apparatus.

The ring 13 comprises a latching mechanism 6 and 7 for holding the ring in place and locking it around the plates 1A. The ring further comprises a hook 14 for hanging the ring, along with the attached housing apparatus 1, on a storage rod 15 located at a storage facility (not shown). As can be seen, when the ring 13 joins the housing parts, the openings 12A, 12B become blocked by the ring 13, thereby securing the data storage devices 5 within the cavities. Further, the ring 13 prevents dust and other contaminants from reaching these devices.

As can be appreciated, the combined structure of the ring 13 and attached housing device 1, has substantially the same external form as that of existing magnetic tape-type reels having attached rings. Therefore, existing storage and retrieval facilities configured to handle magnetic tape-type reels, can now store the smaller differently configured data storage devices 5, via the housing apparatus 1, without requiring modification of the facilities. Furthermore, as the cavities 3 within the housing device 1 can vary in size, shape and numbers, the housing apparatus 1 can accommodate a wide range of different types of storage devices. The introduction of new storage devices can thus be accomodated by the housing apparatus, permitting the continued use of existing storage and retrieval facilities.

As an illustrative example of a housing device 1 adapted to fit inside an existing ring 13 used for a standard 10.5" tape reel, the circular plates 1A would have substantially the same 10.5" diameter as the reel. The thickness of the plates might be 1/16" and the plates could be made of rigid plastic. The inserts 2, in turn, might be made of styrofoam and made to have a diameter $D_{fi}$ slightly less than the diameter of the plates (e.g., 10.25"). A depth D (e.g., 0.3125") for each insert 2 ensures that the outer circumferential edges of the plates 1, properly engage groves in the the existing ring. Cavities 3 have a length L (e.g., 4.5") and a width W (e.g., 4.437") which are sufficient to contain a standard rectangular data storage device (e.g., SyQuest Cartridge, part No. 96036-002, for use in SyQuest SQ312RD cartridge disk drives).

As can be appreciated the disk members 1 can be joined together by other than the ring 13 of the '991 patent, as by clamps or other joining means to realize the housing 1. In such case, the openings 12A, 12B can be closed by flaps or doors attached to the plates 1A if the joining means does not itself close the openings. Also, in such case, a hook can be attached to the housing 1 so it can be stored in facilities used for reel type tapes.

In all cases it is understood that the above-described arrangements are merely illustrative of the many possible specific embodiments which represent applications of the present invention. Numerous and varied other arrangements, can readily be devised in accordance with the principles of the present invention without departing from the spirit and scope of the invention. Thus, for example, the inserts 2 can be formed as a single insert attached to one of the plates 1A, instead of as two inserts. Also, the cavities 3 could be adapted to open out through doors or flaps in the plates 1A, as opposed to opening through the circumferential openings 12A, 12B.

What is claimed is:

1. A housing apparatus adapted to receive a data storage device, the housing apparatus further adapted to be stored and retrieved in a facility configured to handle magnetic tape-type reels, the housing apparatus comprising:

a disk-shaped body having a diameter and a thickness which are approximately the same as the diameter and thickness, respectively, of a magnetic tape-type reel, said disk-shaped body having at least one cavity, each said cavity of said disk-shaped body having an extent which is less than that which would encircle the disk-shaped body, and an opening into said cavity for receiving a data storage device, said disk-shaped body comprising: a first exterior plate and a first interior member affixed to said first exterior plate, said first interior member having a first cutout section; a second exterior plate and a second interior member affixed to said second exterior member, said second interior plate having a second cutout section; said first and second interior members being arranged in abutting relationship and having their first and second cutout sections aligned to form a cavity.

2. A housing apparatus in accordance with claim 1 wherein:

the diameter of said first interior member is less than the diameter of said first exterior plate;

and the diameter of said second interior member is less than the diameter of said second exterior plate.

3. A housing apparatus in accordance with claim 2 wherein:

the first cutout section in said first interior member extends to the periphery of said first interior member;

and the second cutout section in said second interior member extends to the periphery of said second interior member.

4. A housing apparatus in accordance with claim 3 comprising:

a storage and sealing ring engaging and locked in surrounding relationship to peripheries of said first and second exterior plates.

5. A housing apparatus in accordance with claim 4 wherein:

said storage and sealing ring includes a hook means adapted to engage a storage rod located at a facility configured to handle magnetic tape-type reels.

6. A housing apparatus in accordance with claim 3 wherein:

each said first and second exterior plates and each said first and second interior members is circular.

7. A housing apparatus in accordance with claim 6 wherein:

the diameter of each said first and second exterior plates is approximately the same as the diameter of a magnetic tape-type reel.

8. A housing apparatus in accordance with claim 7 further comprising:

a storage and sealing ring engaging and locked in surrounding relationship to peripheries of said first and second exterior plates.

9. A housing apparatus in accordance with claim 1 wherein:

said first interior member has a third cutout section;

said second interior member has a fourth cutout section;

and said first and second interior members being arranged in abutting relationship and having their third and fourth cutout sections aligned to form a cavity.

10. A housing apparatus in accordance with claim 9 wherein:

said first and third cutout sections oppose one another;

and said second and fourth cutout sections oppose one another.

11. A housing apparatus in accordance with claim 10 wherein:

each of said first, second, third and fourth cutout sections is rectangular in shape.

* * * * *

UNITED STATES PATENT AND TRADEMARK OFFICE
CERTIFICATE OF CORRECTION

PATENT NO.  : 5,082,131
DATED       : January 21, 1992
INVENTOR(S) : Michael M. Rauh and Eugene H. Worrell It is certified that error appears in the above-identified patent and that said Letters Patent is hereby corrected as shown below:

Column 4, line 9.  Change "member" to -- plate --

Column 4, line 9.  Change "plate" to -- member --

Signed and Sealed this

Twenty-second Day of June, 1993

Attest:

MICHAEL K. KIRK

Attesting Officer       Acting Commissioner of Patents and Trademarks